3,634,416
Patented Jan. 11, 1972

3,634,416
PURIFICATION OF 7α-AMINOARYLACETAMIDO
Δ³-4-CARBOXY-CEPHALOSPORINS
Harry Schofield, Montrose, Scotland, assignor to Glaxo
Laboratories Limited, Greenford, Middlesex, England
No Drawing. Filed Apr. 3, 1969, Ser. No. 813,285
Claims priority, application Great Britain, Mar. 26, 1969,
15,081/69
Int. Cl. C07d 99/24
U.S. Cl. 260—243                                    5 Claims

ABSTRACT OF THE DISCLOSURE

Purification of a cephalosporin derivative having a 7-α-aminoarylacetamido side chain by precipitating as a crystalline salt by reaction with collidine, a corresponding compound having the amino group protected, separating the salt, aand converting the salt to the corresponding acid, the protective group being removed.

---

This invention relates to a method of purifying cephalosporin derivatives and to the intermediates utilised therein.

Various cephalosporin derivatives have utility as antibiotics, but much difficulty has been experienced in preparing such compounds in good yield and purity. This is particularly the case with cephalosporin derivatives having a 7α-aminoacrylacetamido side chain; such compounds and intermediates in their preparation are not easily obtained in a pure form, gelatinous solids being not infrequently formed. It has now been found that collidine salts of certain precursors of such derivatives have exceptional properties which render them particularly useful as intermediates in the purification of these derivatives. These salts possess the advantage that they can be recovered in a well-defined crystalline form from which the desired end product can be obtained in good yield and purity. Whereas in the absence of the process according to the invention the purity of the end product may leave much to be desired as a pharmaceutical grade material, it is possible by the method according to the invention to prepare end products of high purity.

According to the invention, therefore, there is provided a method of preparing a compound having the formula:

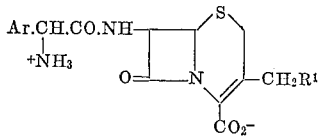

(I)

wherein Ar is an aromatic group (including heterocyclic aromatic), $R^1$ is —H, OAc, —OH or residue of a substituting nucleophile e.g. $N_3$ or an O-ether group which includes the step of forming a salt of a compound of the formula:

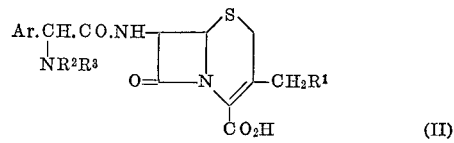

(II)

wherein Ar and $R^1$ have the above meanings, $R^2$ is a protecting group and $R^3$ is hydrogen or a protecting group which may form a ring system with $R^2$, with a collidine (e.g. symmetrical 2,4,6-trimethylpyridine), preferably followed by separation of the salt, conversion back to the corresponding acid and formation of the compound of Formula I.

The invention, furthermore, provides a method of making said salt of a compound having Formula II above, which comprises contacting collidine therewith.

The collidine salts of compounds of Formula II are novel and also form part of the invention.

The group Ar in Formulae I and II may be phenyl, or phenyl substituted by, for example, one or more halo, hydroxy, lower alkyl, nitro, amino, substituted amino, lower alkanoyl, lower alkoxy or lower alkylmercapto substituents, or it may be a heterocyclic group e.g. thienyl.

The protecting group $R^2$ (and/or $R^3$) is conveniently one which can be removed by hydrolysis without affecting the rest of the molecule, especially the lactam and 7β-amido linkages. Protected groups include urethane, arylmethyl (e.g. trityl)-amino, arylmethyleneamino, sulphenylamino and enamine types. Such groups can in general be removed by one or more reagents selected from dilute mineral acids, e.g. dilute hydrochloric acid, concentrated organic acids, e.g., concentrated acetic acid, and trifluoroacetic acid, and liquid hydrogen bromide at very low temperatures, e.g., —80° C. A convenient protecting group is the t-butoxycarbonyl group, which is readily removed by hydrolysis with dilute mineral acid, e.g., dilute hydrochloric acid, or preferably with a strong organic acid (e.g. formic acid or trifluoroacetic acid) e.g. at a temperature of 0–40° C., preferably at room temperature (15–25° C.). Another convenient protecting group is the β,β,β-trichloroethoxy carbonyl group which may be split off by an agent such as zinc in acetic acid, formic acid, lower alcohols or pyridine.

Typical protecting groups and their methods of removal are illustrated in the following table:

| Type | Example | Usual name and analogues, etc. | Usual method of removal |
|---|---|---|---|
| Urethane | HNCOCH₂Ph (C=O) | Benzyloxycarbonyl, p-methoxy | HBr/AcOH (Neat); CF₃COOH (Neat); Liq. HBr at −80° C. |
| Urethane | HNCOC(CH₃)₃ (C=O) | t-Butoxycarbonyl | Dil. acid (HCl); CF₃COOH (Neat) |
| Urethane | HNCOCOPh₂ (C=O) | Diphenylmethoxycarbonyl | CF₃COOH (Neat); Dil. HCl etc. |
| Urethane | HNCO—(1-adamantyl) (C=O) | 1-adamantyloxycarbonyl | Dil. HCl. |
| Arylmethyl | HNCPh₃ | Trityl | AcOH+H₂O; Dil. HCl. |

| Type | Example | Usual name and analogues, etc. | Usual method of removal |
|---|---|---|---|
| Sulphenyl | HN—S—C$_6$H$_4$—NO$_2$ | o-Nitrophenylsulphenyl, p-nitro | Dil. HCl; NaI or Na$_2$S$_2$O$_3$; ph 2–4. |
| Enamine | (enamine structure with N, C—CH$_3$, C—H, O, C, R) | β-Dicarbonyl: R=OEt, ethyl acetoacetate; R=CH$_3$, acetylacetone; R=Ph, benzoylacetone; R=OMe, methyl acetoacetate; R=C$_2$H$_5$, propionylacetone; and many other β-diketones. | Acid labile in varying degree; Dil. AcOH or HCl, etc. |
| Arylmethylene | N=CH—C$_6$H$_4$—OH | Anil (similar to β-dicarbonyl) from salicylaldehyde: 5-chlorosalicylaldehyde; 3,5-dichlorosalicylaldehyde; 2-hydroxy-1-naphthaldehyde; 3-hydroxy-pyridine-4-aldehyde. | Dil. HCl; Formic acid. |
| Urethane | HN.CO.OCH$_2$CCl$_3$ | β,β,β-trichloroethoxycarbonyl | Reducing agents, e.g. Zn/acetic acid. |

Formation of the salt is suitably carried out in the liquid phase e.g. in an inert organic solvent or in water. The solvent may be a ketone, such as acetone, methyl ethyl or methyl isobutyl ketone, or an ester such as ethyl acetate or butyl acetate.

The reaction between the collidine, referred to herein for convenience as "the organic base," and the compound of Formula II should be effected under conditions of temperature and mixing such that the desired salt is precipitated in a form which is crystalline, filterable and washable. Thus on a small scale the organic base, or a solution thereof, may be added rapidly to a solution of the compound of Formula II at a relatively low temperature, such as 25–30° C. On a larger scale, the organic base is advantageously added slowly to a solution of the compound of Formula II at an elevated temperature, such as 40–60° C., suitably 50° C. During the addition of organic base, the mixture should be agitated. The reaction mixture is cooled and allowed to stand long enough for the product to crystallise out fully. Conventional methods of assisting crystallisation may be employed when necessary. The product is then separated from the mother liquor e.g. by filtration or centrifugation.

The salt may be further purified by one or more recrystallisations from a suitable solvent, such as acetone or methyl ethyl ketone.

The compound of Formula II may be regenerated from its salt by treatment with an acid, conveniently an acid the corresponding organic base salt of which is water soluble. A preferred method of regenerating the compound of Formula II comprises acidifying its salt with an aqueous acid and extracting the desired product into an organic solvent such as ethyl acetate or methyl isobutyl ketone. An acid addition salt of the organic base remains in the aqueous phase. Suitable acids include strong mineral acids e.g. hydrochloric and sulphuric acids. Care should be taken at this stage to eliminate the organic base from the organic phase and hence from the cephalosporin.

The conversion of the compound of Formula II to a compound of Formula I is accomplished by removal of the protecting group(s) R$^2$ and/or R$^3$ by any suitable method, e.g. hydrolysis or hydrogenolysis, depending on the nature of the protecting group(s) R$^2$ and/or R$^3$. Clearly the method of removal must be one that does not cause degradation of the other parts of the molecule. When R$^3$=H and R$^2$=t-butyloxycarbonyl, the latter may be removed by treatment with glacial acetic acid containing hydrochloric acid, suitably at an elevated temperature, such as 40°.

It will be realised that in some cases the protecting group(s) R$^2$ and/or R$^3$ may be removed simultaneously with the decomposition of the organic base salt.

The crystallisation and isolation of the salt substantially eliminates starting materials and by-products formed earlier in the overall process. Such an impurity is D-phenylglycine, when making compounds of Formula I in which Ar is an unsubstituted phenyl group. Impurities with the L-configuration are also removed at this same stage. These impurities considerably reduce the yield of compounds of Formula I, when such compounds are prepared directly from compounds of Formula II without proceeding through the salt and the process of this invention.

Compounds of Formula II may be made, inter alia, by acylating a compound of the formula:

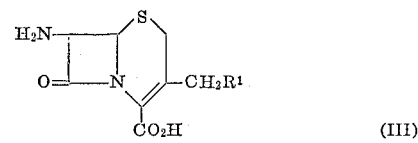

(III)

where R$^1$ has the above-defined meaning, or an acid addition salt thereof, with an amino-protected, α-aminoarylacetic acid or amide-forming derivtive thereof.

In order that the invention may be well understood the following example is given by way of illustration only.

EXAMPLE (a) 7β - (D - α - t - butyloxycarbonylamino - α - phenylacetamido) - 3 - methylceph - 3 - em - 4 - carboxylic acid 2,4,6-collidine salt Ethyl chloroformate (6.2 ml.) was added to a stirred solution of D(—) - α - t - butyloxycarbonylamino-α-phenylacetic acid (16.2 g.) in dioxan (162 ml.) at 10°. Triethylamine (9.2 ml.) was then added with continued stirring and the temperature rose to 20°, with precipitation of triethylamine hydrochloride. Three minutes after the addition of the triethylamine to the dioxan solution, a solution of 7β-amino - 3 - methylceph - 3 - em-4-carboxylic acid (11.55 g.) in water (110 ml.) containing triethylamine (7.55 ml.) was added rapidly to the stirred suspension at 20° and stirring of the resulting solution continued for 10 minutes at this temperature. Methyl isobutyl ketone (107.5 ml.) and N-hydrochloric acid containing 5% sodium chloride (80 ml.) were added and a further 10 minutes stirring given. The layers were separated and the organic layer washed three times with water (55 ml. per wash). All the aqueous layers were given a backwash with methyl isobutyl ketone (55 ml.). The organic layers were combined, dried over sodium sulphate, stirred for ½ hour with charcoal (4.85 g.) and filtered. The residue was washed with methyl isobutyl ketone (40 ml.). The filtrate and wash were combined and evaporated in vacuo to a volume of 125 ml. which was made up to 150 ml. with methyl isobutyl ketone. The solution was treated at 40° with a solution of 2,4,6-collidine (9.2 ml.) in methyl isobutyl ketone (25 ml.) and the title compound separated. Crystallisation was completed by cooling to 0°. The collidine salt was collected by filtration, washed with methyl isobutyl ketone (40 ml.) then ether (40 ml.) and dried at 40° in vacuo to give 17.25 g. of white crystals (56.4% of theory, based on the cephalosporin intermediate), $[\alpha]_D$ +65° (C, 0.5 in 70% EtOH), $\lambda_{max}$ 70% EtOH 268 nm., $E^{1\%}_{1cm.}$ 147 $\lambda_{min.}$ 240 nm. $E^{1\%}_{1cm.}$ 99

(b) 7β-(D-α-amino-α-phenylacetamido)-3-methylceph-3-em-4-carboxylic acid

7β - (D - α - t - butyloxycarbonylamino - α - phenylacetamido) - 3 - methylceph - 3 - em - 4 - carboxylic acid, 2,4,6-collidine salt (15.38 g.) was converted into the free acid by acidification with 1.2 N hydrochloric acid (30 ml.) and extracted into ethyl acetate (65 ml.). The extract was washed three times with water (12.5 ml. per wash). All the aqueous layers were given a backwash with ethyl acetate (17 ml.). The organic layers were combined, dried over sodium sulphate, stirred for 1 hour with charcoal (1.5 g.) and filtered. The residue was washed with ethyl acetate (40 ml.). The filtrate and wash were combined and evaporated in vacuo to dryness and the residue dissolved in a mixture of glacial acetic acid (30 ml.) and 2 N hydrochloric acid (30 ml.). The solution was heated 50° for 50 minutes and then cooled to 20°. The solution was shaken with Amberlite LA2 liquid resin (16 ml.) in ether (150 ml.) and the lower aqueous layer separated. The ether layer was re-extracted with water (7.5 ml. then 3.5 ml.) and the aqueous layers combined and clarified. The aqueous solution was adjusted to pH 4 with triethylamine and the product crystallised. The resulting suspension was diluted with acetone (125 ml.) and cooled to 0°. The title compound was collected by filtration, washed with acetone and dried at 40° in vacuo to give 8.9 g. of white crystals (94.8% theory), $[\alpha]_D$+153° (C, 0.5% in pH 4.4 buffer), $\lambda_{max}$ $H_2O$ 263 nm., $E^{1\%}_{1cm.}$ 240 $\lambda_{min.}$ 237 nm. $E^{1\%}_{1cm.}$ 182

I claim:

1. In a method for preparing a 7α-aminoarylacetamido-Δ³ - 4 - carboxy - cephalosporin wherein the aryl moiety is thienyl, phenyl or phenyl substituted by at least one of halo, hydroxy, lower alkyl, nitro, amino, lower alkanoyl, lower alkoxy or lower alkylmercapto, the steps of reacting a corresponding cephalosporin in which the α-amino group is protected with 2,4,6-trimethylpyridine and separating the resulting crystalline salt.

2. A method as defined in claim 1 in which said 7α-aminoarylacetamido - Δ³ - 4 - carboxy-cephalosporin is regenerated from the separated salt.

3. A method as defined in claim 1 in which the cephalosporin has a 7α-aminophenylacetamido group.

4. A method as defined in claim 1 which the α-amino group is protected by a group selected from the group consisting of a t-butoxycarbonyl and a β,β,β - trichloroethoxycarbonyl group.

5. 7β - (D - α - t - butyloxycarbonylamino - α - phenylacetamido)-3-methylceph - 3 - em - 4 - carboxylic acid 2,4,6-trimethylpyridine salt.

References Cited

UNITED STATES PATENTS 3,352,858  11/1967  Crast _____ 260—243 C

NICHOLAS S. RIZZO, Primary Examiner

UNITED STATES PATENT OFFICE
CERTIFICATE OF CORRECTION

Patent No. 3,634,416   Dated January 11, 1972

Inventor(x)  Harry Schofield

It is certified that error appears in the above-identified patent and that said Letters Patent are hereby corrected as shown below:

Column 1, line 7, "Mar. 26, 1969" should read --Mar. 21, 1969--.

Signed and sealed this 20th day of June 1972.

(SEAL)
Attest:

EDWARD M. FLETCHER, JR.
Attesting Officer

ROBERT GOTTSCHALK
Commissioner of Patents